US008055018B2

(12) United States Patent
Han et al.

(10) Patent No.: US 8,055,018 B2
(45) Date of Patent: Nov. 8, 2011

(54) OBJECT IMAGE DETECTION METHOD

(75) Inventors: Chin-Chuan Han, Hsinchu (TW);
Ying-Nong Chen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 952 days.

(21) Appl. No.: 12/023,936

(22) Filed: Jan. 31, 2008

(65) Prior Publication Data
US 2008/0260239 A1   Oct. 23, 2008

(30) Foreign Application Priority Data
Apr. 17, 2007   (TW) ................................ 96113464 A

(51) Int. Cl.
*G06K 9/00* (2006.01)
*G06K 9/62* (2006.01)

(52) U.S. Cl. ...................................... 382/103; 382/156

(58) Field of Classification Search ................ 382/100, 382/103, 115, 118, 154, 156, 157, 159, 160, 382/165, 169–173, 190, 203, 206, 224–226, 382/236, 266, 270–274, 276, 278, 290, 293–294; 348/14.03, 14.08, 14.1, 51, 149, 164, 169; 250/330, 334, 339.14, 342, 353; 345/7, 473; 715/863; 706/52
See application file for complete search history.

(56) References Cited

U.S. PATENT DOCUMENTS

| | | | | |
|---|---|---|---|---|
| 6,707,933 B1 * | 3/2004 | Mariani et al. | ................. | 382/118 |
| 6,915,022 B2 * | 7/2005 | Huang et al. | ................. | 382/266 |
| 7,139,411 B2 * | 11/2006 | Fujimura et al. | ................. | 382/103 |
| 7,266,225 B2 * | 9/2007 | Mariani et al. | ................. | 382/118 |
| 7,436,988 B2 * | 10/2008 | Zhang et al. | ................. | 382/118 |
| 2010/0165136 A1 * | 7/2010 | Johnson et al. | ............. | 348/222.1 |
| 2010/0284619 A1 * | 11/2010 | Song et al. | ................. | 382/190 |

FOREIGN PATENT DOCUMENTS

| | | |
|---|---|---|
| TW | 420939 | 2/2001 |
| TW | 505892 | 10/2002 |
| TW | 550517 | 9/2003 |
| TW | 569148 | 1/2004 |

(Continued)

OTHER PUBLICATIONS

Henry A. Rowley, et al., Neural network-based face detection, IEEE Transaction on Pattern Analysis and Machine Intelligence, vol. 20, pp. 23-38, 1998.

(Continued)

*Primary Examiner* — Samir Ahmed
*Assistant Examiner* — Mehdi Rashidian
(74) *Attorney, Agent, or Firm* — Rosenberg, Klein & Lee

(57) ABSTRACT

The present invention discloses an object image detection method, which uses a coarse-to-fine strategy to detect objects. The method of the present invention comprises steps: acquiring an image and pre-processing the image to achieve dimensional reduction and information fusion; using a trained filter to screen features; and sequentially using a coarse-level MLP verifier and a fine-level MLP verifier to perform a neural network image detection to determine whether the features of the image match the features of the image of a target object. The present invention simultaneously uses three mainstream image detection methods, including the statistic method, neural network method and adaboost method, to perform image detection. Therefore, the present invention has the advantages of the rapidity of the adaboost method and the accuracy of the neural network method at the same time.

24 Claims, 4 Drawing Sheets

FOREIGN PATENT DOCUMENTS

| | | |
|---|---|---|
| TW | I226020 | 1/2005 |
| TW | I233571 | 6/2005 |
| TW | I254891 | 5/2006 |

OTHER PUBLICATIONS

Christophe Garcia and Manolis Delakis, Convolutional face finder: A neural architecture for fast and robust face detector, IEEE Transaction on Pattern Analysis and Machine Intelligence, vol. 26, pp. 140.

A. N.Rajagopalan, et al., Background Learning for Robust Face Recognition With PCA in the Presence of Cluster, IEEE Transaction on Image Processing, vol. 14, No. 6, pp. 832-843, 2005.

Paul Viola and Michael J. Jones, Robust Real-Time Face Detection, International Journal of Computer Vision, vol. 57, No. 2, pp. 137-154, 2004.

Chengjun Liu, A Bayesian discriminating features method for face detection, IEEE Transactions on Pattern Analysis and Machine Intelligence, vol. 25, No. 6, pp. 725-740, Jun. 2003.

Raphael Feraud, et al., "A fast and accurate face detector based on neural networks" IEEE Transactions on Pattern Analysis and Machine Intelligence, vol. 23, pp. 42-52, 2001.

Masakazu Matsugu, Katsuhiko Mori, Yusuke Mitari, and Yuji Kaneda, Subject independent facial expression recognition with robust face detection using a convolutional neural network, Neural Networks, vol. 16, pp. 555-559, 2003.

Kah-Kay Sung and Tomaso Poggio, Example-based learning for view-based human face detection, IEEE Trans. Pattern Analysis and Machine Intelligence, vol. 20, No. 1, pp. 39-51, 1998.

Rein-Lien Hsu, Mohamed Abdel-Mottaleb, and Anil K. Jain, Face detection in color images, IEEE Trans. Pattern Analysis and Machine Intelligence, vol. 24, No. 5, pp. 696-706, 2002.

Peichung Shih, and Chengjun Liu, Face detection using discriminating feature analysis and support vector machine, Pattern Recognition, vol. 39, pp. 260-276, 2006.

Christopher A. Waring, and Xiuwen Liu, Face Detection Using Spectral Histograms and SVMs, IEEE Trans. Systems, Man, and Cybernetics-Part B: Cybernetics, vol. 35, No. 3, pp. 467-476, 2005.

Rong Xiao, Ming-Jing Li, and Hong-Jiang Zhang, Robust multipose face detection in images, IEEE Trans. Circuits and Systems for Video Technology, vol. 14, No. 1, pp. 31-41, 2004.

Yongmin Li, Shaogang Gong, Jamie Sherrah, and Heather Liddell, Support vector machine based multi-view face detection and recognition, Image and Vision Computing, vol. 22, pp. 413-427, 2004.

Bernd Heisele, Thomas Serre, Sam Prentice, and Tomaso Poggio, Hierarchical classification and feature reduction for fast face detection with support vector machines, Pattern Recognition, vol. 36, pp. 2007-2017, 2003.

* cited by examiner

OBJECT IMAGE DETECTION METHOD

BACKGROUND OF THE INVENTION

1. Field of the Invention

The present invention relates to a detection method, particularly to an object image detection method.

2. Description of the Related Art

Object image detection technologies have been applied to many technical fields. The parameters used in an object image detection method should vary or be modified with the detected object. The most common object image detection methods include the statistic method and the neural network method recently. These two common object image detection methods are further discussed below.

Face detection technologies are used to exemplify the statistic method, wherein Principle Component Analysis (PCA) is adopted. In one application thereof, a face training sample and a non-face training sample are respectively divided into a plurality of clusters and the clusters are compared with each feature of an object image to determine the distance therebetween. In the distance evaluation, the feature vectors of all the clusters are first worked out; next, the Mahalanobis distances between the object image and the feature vectors are calculated to determine the similarities between the object image and the clusters. Next, the object image is projected to each cluster to calculate the distance between the object image and the cluster center. When most features of the object image meet the face training sample, the object image is determined to be a human face. When most features of the object image meet the non-face training sample, the object is determined to be not a human face. In another application, the face detection technology is based on the Bayesian image analysis, wherein the features of an object image are first obtained from 1-D Haar transform images perpendicular to each other, and the projected histograms. Next, the probability density functions of a face sample and a non-face sample are constructed. Next, based on the face and non-face probability density functions, the image features are converted into input vectors. Then, whether the input image is a human face is determined with the Bayesian method.

In the neural network method, every pixel of an image is usually as an input to train the neural network classifier. In such an approach, what is input is the original image. In other words, the image without feature extraction is used to train a neural network classifier. Therefore, the complexity of calculation increases, which impairs applications needing a high speed image processing. To solve such a problem, there is another approach of the neural network method, wherein local features of an image are modularized beforehand. The modularized features are input to separately train different neural network classifiers. Although the modularized features come from an identical image, no connection exists between them in training. Therefore, a special module is used to integrate the modularized features to complete the image detection task. For example, when the object is a human face, the modularized features may be: eyes, mouth, nose, etc. In such a case, the special module integrating the modularized features may be a complexion-filtering module. When a neural network classifier identifies a human face, the modularized features of eyes, mouth, and nose, together with the complexion-filtering module, are used in comparison to determine whether the input image is a human face.

Besides the abovementioned two object image detection methods, the adaboost algorithm, support vector machine (SVM), multi-information objection methods also prevail in industrial and academic fields. Among them, the adaboost algorithm is particularly popular because it has a very fast detection speed. However, the adaboost algorithm needs a very long training time because a great number of features need screening in training. Thus, the training results are unlikely to be fast obtained, and the usefulness of the adaboost algorithm is decreased.

As the statistic method filters out unnecessary data beforehand, it has shorter training time. However, the statistic method has lower detection accuracy and lower detection efficiency. For the neural network method, the training efficiency correlates with the complexity of the object image. A simpler object image needs less training time and detection time but has lower detection accuracy. A more complicated object image needs more detection time but has higher detection accuracy. The adaboost algorithm has higher detection speed but needs longer training time. Thus, the conventional statistic method, neural network method and adaboost algorithm respectively have their weaknesses and strengths. However, generally to speak, they are all unlikely to extensively apply to realtime object detection systems.

Accordingly, the present invention proposes an object image detection method, which integrates the conflicting strengths to simultaneously achieve the speed and accuracy of object detection.

SUMMARY OF THE INVENTION

The primary objective of the present invention is to provide an object image detection method, which has a simple and fast object image detection process, wherein an adaboost algorithm is used to reduce the number of window images needing inspection, and a neural network architecture is used to reduce the time consumed in inspecting window images, whereby realtime object detection is realized.

Another objective of the present invention is to provide an object image detection method, which applies to human face detection, wherein a coarse-to-fine strategy is used to achieve an object image processing speed of at least 13 frames per second.

Further objective of the present invention is to provide an object image detection method, which pertains to the fields of information, computer and visual display, wherein the realtime image detection capability thereof can extensively apply to the computer visual display industry, security monitor industry and amusement game industry.

To achieve the abovementioned objectives, the present invention proposes an object image detection method, which utilizes a trained image verifier to identify images. The object image detection method of the present invention comprises the following steps: acquiring a sample, which may be a large-size image, and working out a plurality of window images corresponding to the image; extracting surface features from the image; processing the window images to obtain a plurality of pixels corresponding to the window images, and calculating the weighted values of the pixels; screening and pre-filtering all the window images according to the weighted values to choose fewer window images from all the window images; performing at least two cycles of multi-layer perception (MLP) operations to verify the image formed of the chose window images, and determining the sample to be true if the object image formed of the chose window images is verified to be an effective object image, and determining the sample to be false if the object image formed of the chose window images is verified to be an ineffective object image. The verifier used to determine whether the sample is true or false is trained with the following steps: collecting and processing a plurality of positive and negative samples; extracting surface features from the processed positive and negative samples; calculating the processed positive and negative samples to obtain corresponding pixels; selecting the positive and negative samples to train the setting of parameters of a fine-level MLP operation; processing the positive and negative samples used in the fine-level MLP operation to obtain corresponding weighted values; choosing the positive and negative samples having specified ranges of weighted values according to the abovementioned corresponding weighted values, and training the setting of parameters of a pre-filter with the chose positive and negative samples; selecting a portion of the positive and negative samples from the positive and negative samples used in training the pre-filter to train the setting of parameters of a coarse-level MLP operation. Thus, in the present invention, an object image is verified with the process trained with a plurality of positive and negative samples.

The object image detection method of the present invention can establish a simple process to fast and realtime detect object images. Therefore, the method of the present invention is very suitable for human face detection.

Below, the embodiments will be described in detail in cooperation with the attached drawings to make easily understood the objects, technical contents, characteristics and accomplishments of the present invention.

DETAILED DESCRIPTION OF THE INVENTION

In electronic security systems, such as video monitoring systems, burglar-protection devices, entrance guard devices, integrated building automation systems, etc., the detected objects are feature-verified before personal identification. For example, a detected object should be verified to be a human face before performing personal identity verification. Therefore, an object image detection method should be able to undertake realtime and precise object detection.

The present invention proposes an object image detection method to meet requirements of the computer visual display industry, security monitor industry and amusement game industry. The present invention possesses the technical superiorities of fast training and realtime detection simultaneously. Below, the present invention will be exemplified with human face detection and described in detail in cooperation with the drawings.

Figure 1:
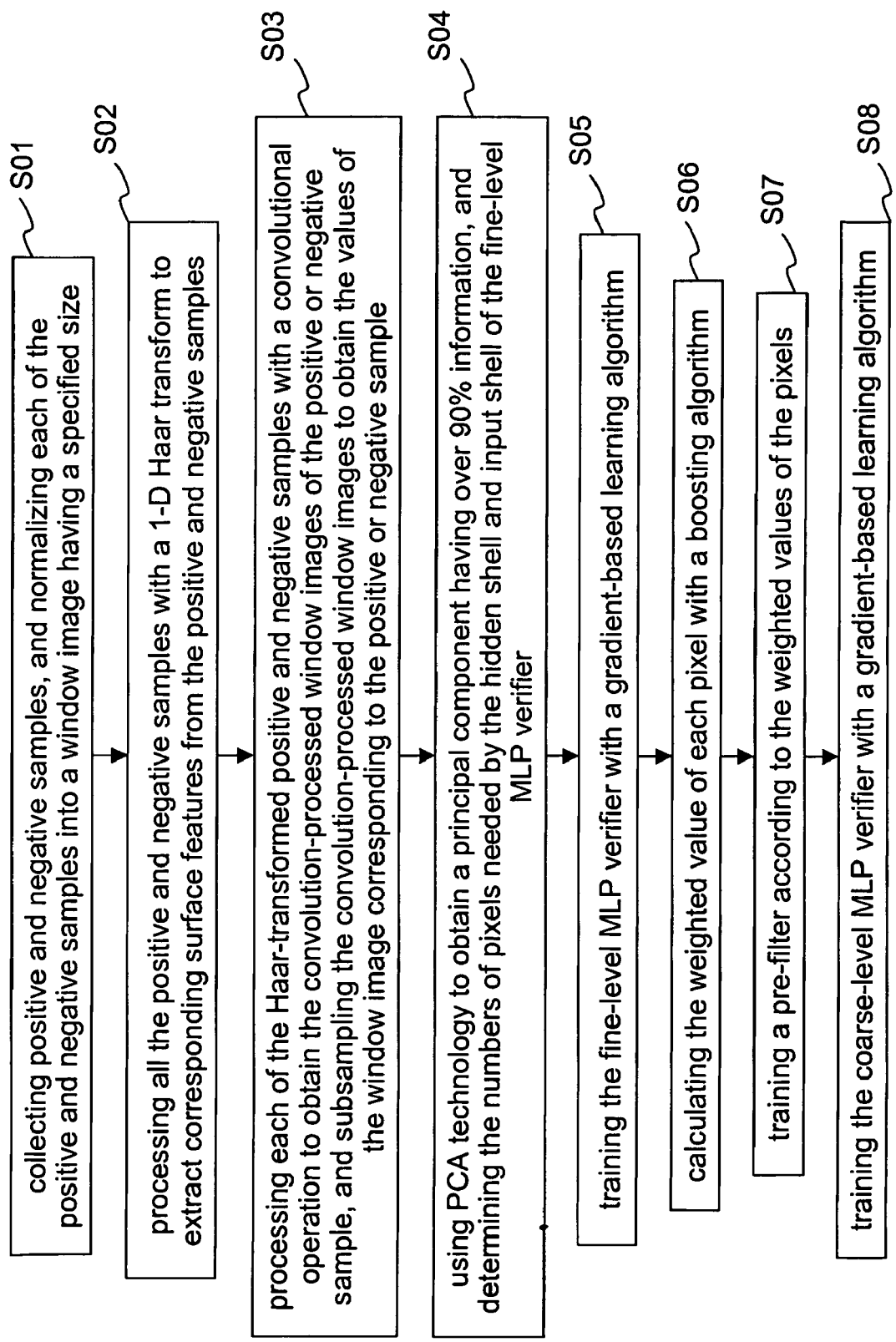
FIG. 1 is a flowchart of a fast training method of a human face detection embodiment of the present invention.

Refer to FIG. 1 for a flowchart of a human face detection process of one embodiment of the present invention. In Step S01, since the objects of detection are human faces, 5000 positive samples (human face samples) and 5000 negative samples (non-face samples) are collected, and each of the positive and negative samples is normalized into a window image having a specified size. In this embodiment, each sample is normalized into a 32×36 window image. In Step S02, all the positive and negative samples are processed with a 1-D Haar transform operation to extract corresponding surface features from the positive and negative samples. In Step S03, each of the Haar-processed positive and negative samples is processed with a convolution operation to obtain a convolution-processed positive or negative window image, which is further subsampled to obtain a window image value corresponding to a positive or negative sample. In Step S04, each of the positive and negative samples obtained in Step S03 is converted into a 6×7 window image; the pixels of the 6×7 window image is cascaded into a 1-D feature vector; the 1-D feature vector is processed with a PCA (Principle Component Analysis) technology to obtain a principal component having over 90% information; the number of nerve cells required by the hidden shell of the fine-level MLP (Multi-Layer Perception) verifier is also determined. In this embodiment, the hidden shell of the fine-level MLP verifier needs about 10 principal-component nerve cells, and the number of the input points to the input shell of the fine-level MLP verifier is identical to the number of the pixels of the 6×7 window image, i.e. 42. In Step S05, 10 principal-component pixels of the hidden shell and 42 input points of the input shell of the fine-level MLP verifier are input to function as input samples; the fine-level MLP verifier is trained with a gradient-based learning algorithm; the coefficients of the fine-level MLP verifier and the convolutional feature map will learn a verification mode after training. In Step S06, the same input samples as in Step S05 are processed with a boosting algorithm to obtain the weighted values corresponding to the pixels of each 6×7 window image. In Step S07, the weighted value of each pixel is used to determine whether a feature can be filtered out. In this embodiment, about 50% window images, which need about 10 pixel features, are filtered out. The features are then arranged in sequence to complete the training of the pre-filter. In Step S08, the front half of the input points of the input shell of the fine-level MLP verifier in Step S05, i.e. the front 21 pixels, are input to function as the pixels of the input shell of a coarse-level MLP verifier; the coarse-level MLP verifier is also trained with the gradient-based learning algorithm; thereby, the coefficients of the coarse-level MLP verifier will learn a verification mode after training.

From the above training method, it is known that either of the fine-level MLP operation and coarse-level MLP operation is a neural network detection method. Therefore, the neural network architecture in the present invention is determined in a statistic way during training. In the above embodiment, the coarse-level neural network training and the fine-level neural network training respectively need only 224 minutes and 88 minutes. The trained information is repeatedly used and a pre-filter is trained by a pixel-based pre-filter mechanism. Thereby, the pre-filter training can be completed in about 10 minutes. Therefore, the method of the present invention can indeed achieve the objective of fast training. In the above embodiment, the training samples have positive and negative samples both of the same number. However, the positive and negative samples may have different numbers in some design of parameters.

Figure 2:
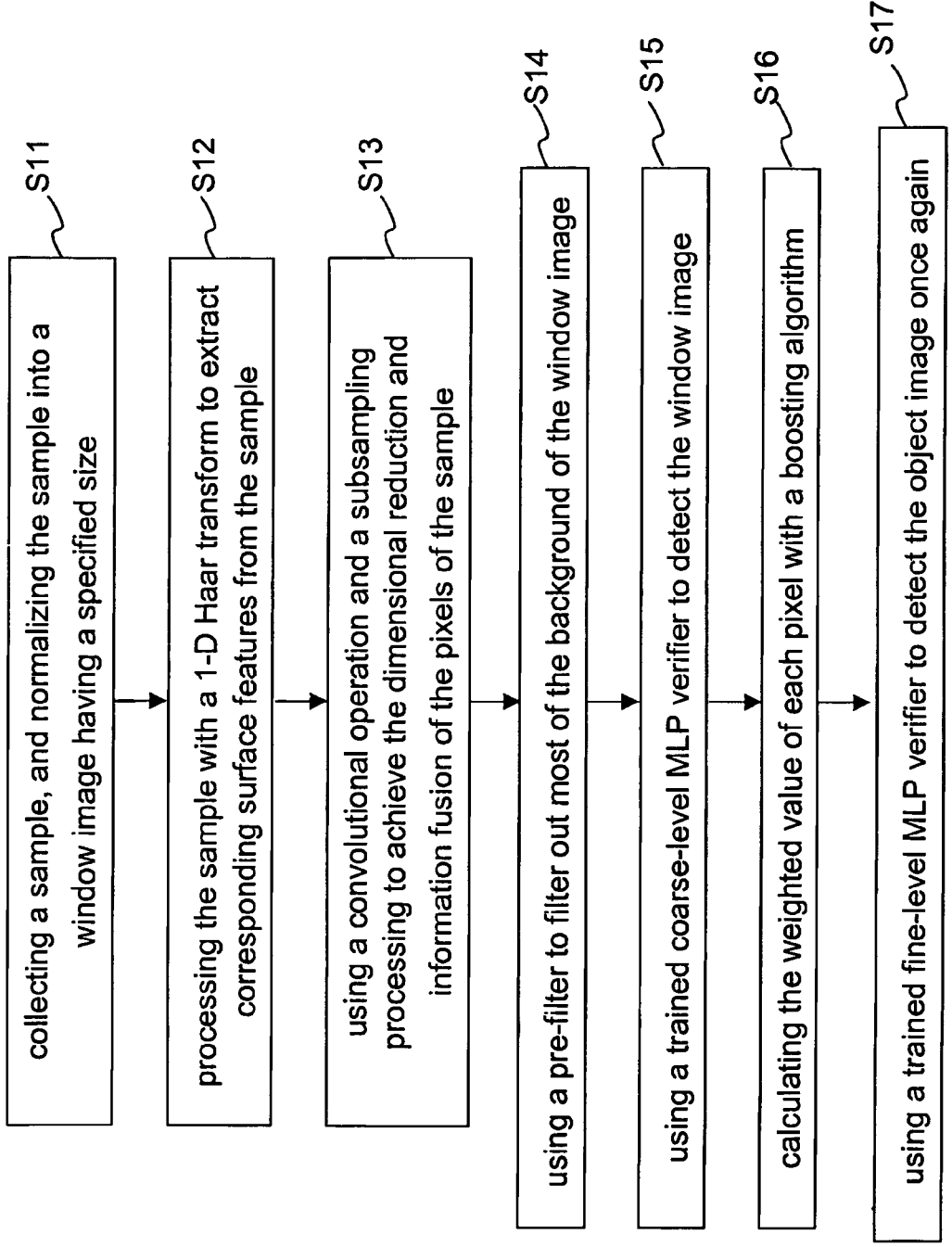
FIG. 2 is a flowchart of a detection method of a human face detection embodiment of the present invention.
Figure 3:
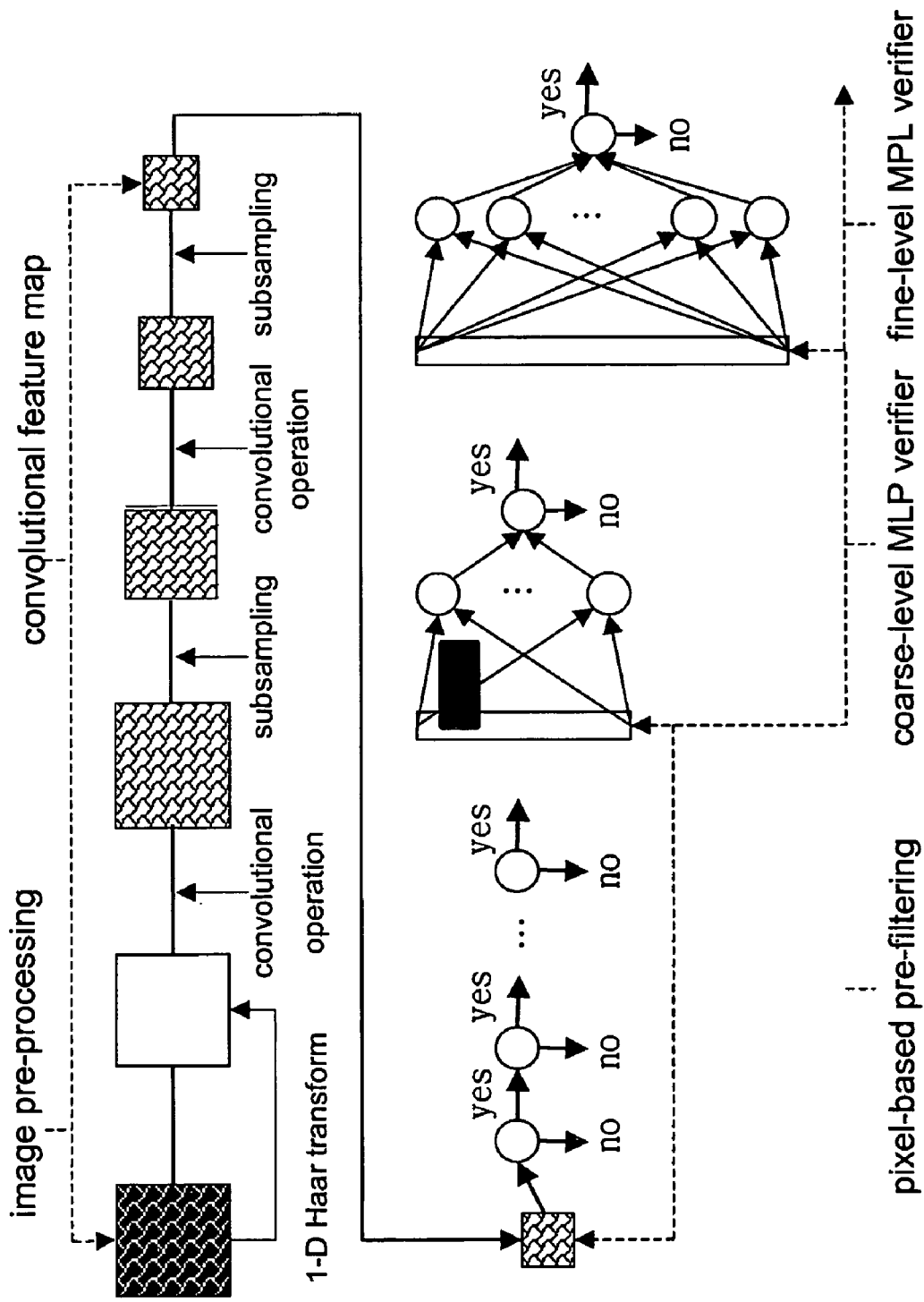
FIG. 3 is a block diagram of the detection method shown in FIG. 2.

Based on the training method shown in FIG. 1 is proposed a human face detection embodiment of the object image detection method of the present invention below. Refer to FIG. 2 and FIG. 3 respectively a flowchart of a human face detection embodiment of the object image detection method of the present invention and a block diagram corresponding to the flowchart shown in FIG. 2. The human face detection method shown in FIG. 2 is based on the training method shown in FIG. 1. Thus, in Step S11, a sample is collected and normalized into a window image having a specified size. In this embodiment, the sample is normalized into a 32×36 window image. In Step S12, the sample is processed with a 1-D Haar transform operation to extract corresponding surface features from the sample. In Step S13, a convolution operation is similarly used to perform information fusion of the pixels of the window image; the window image is subsampled to reduce its dimensions; each pixel of the convolution-processed and subsampled window image can be regarded as a single simple feature. In Step S14, the window image obtained in Step S13 is used as a first-stage pre-filter. From the training result of the process shown in FIG. 1, it is known that about 50% window images can be filtered out. In this embodiment, just 10 pieces of feature information is enough to achieve the objective of filtering at last. In Step S15, the trained coarse-level MLP verifier is used to detect the window image in advance. In Step S16, a boosting algorithm is used to calculate the weighted values of the pixels corresponding to said positive and negative samples. In Step S17, the trained fine-level MLP verifier is used to detect the object image once again. If the window image is verified to be an effective object image, the sample is determined to be a human face image. If the window image is verified to be an ineffective object image, the sample is determined to be a non-face image. The coarse-level MLP verifier and the fine-level MLP verifier used in Step S15 and Step S17 are the same as those used in the process of FIG. 1. Therefore, the nerve cells of the hidden shell of the coarse-level MLP verifier used in FIG. 2 are less than those of the fine-level MLP verifier.

From the human face detection method of the present invention shown in FIG. 2 and FIG. 3, it is known that the present invention takes a coarse-to-fine object detection strategy. Therefore, the present invention can improve detection speed from two sides at the same time. In one side, the neural network architecture is used to fast check each window image and rapidly determine whether the acquired image is a human face, and the checking time for each window image is thus reduced. In the other side, most of the background is filtered out by a simple feature pre-filter method and thus the number of the window images needing check is reduced. Then, verifiers are used to decide the location and size of the object. Thereby, the present invention has a detection speed faster than a general neural network detector or a general statistic detector.

Figure 4:
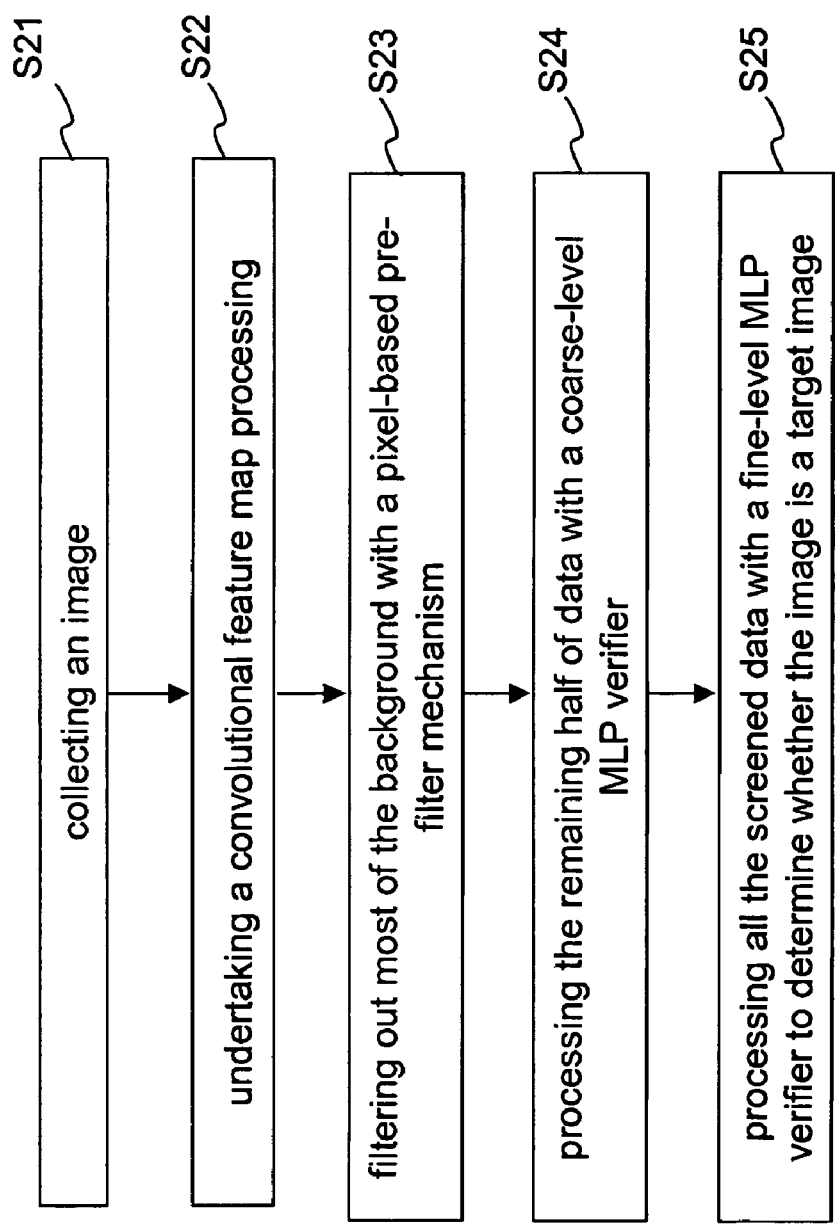
FIG. 4 is a flowchart of an object image detection method of one embodiment of the present invention.

Although the object image detection method of the present invention is exemplified with the human face detection shown in from FIG. 1 to FIG. 3, the present invention in fact can perform different training and different detection according to the collected images. In the pre-processing, different types of images will have different parameter settings. However, no matter what type of image is acquired, the primary image detection steps are similar, as shown in FIG. 4. In Step S21, an image is collected. In Step S22, a convolutional feature map processing is undertaken. In Step S23, a pixel-based pre-filter mechanism is used to filter out most of the background. In Step S24, the remaining half of data is processed with a coarse-level MLP verifier. In Step S25, all the screened data is processed with a fine-level MLP verifier to determine whether the image is a target image.

In conclusion, the present invention adopts an integration-type detection architecture to reduce the number of window images needing check and reduce the time for checking each window image at the same time. In a human face detection embodiment, the present invention can reliably achieve a detection speed of 13 frames per second. Further, the present invention trains the neural network with a statistic method and applies the training results to a pixel-based pre-filter mechanism. Therefore, every stage of the training method, which the object image detection method of the present invention is based on, has a pretty high speed.

The embodiments described above are to exemplify the present invention to enable the persons skilled in the art to understand, make, and use the present invention. However, it is not intended to limit the scope of the present invention. Any equivalent modification or variation according to the spirit of the present invention is to be also included within the scope of the present invention, which is based on the claims stated below.

What is claimed is:

1. An object image detection method, which utilizes a trained image-processing method to undertake object image detection, comprising steps:
    collecting a sample and working out a plurality of window images corresponding to said sample;
    processing said window images to obtain pixels corresponding to said window images, and calculating said pixels to obtain weighted values corresponding to said pixels;
    screening all said window images according to said weighted values of said pixels and then performing a pre-filter process to obtain fewer screened window images from all said window images; and
    performing at least two cycles of multi-layer perception (MLP) operations to verify an image formed of said screened window images, and determining said sample to be true if said image formed of said screened window images is verified to be an effective object image, and determining said sample to be false if said image formed of said screened window images is verified to be an ineffective image wherein in said step of screening all said window images according to said weighted values of said pixels and performing said pre-filter process to obtain said screened window images from all said window images, a number of said screened window images is a half of a number of all said window images.

2. The object image detection method according to claim 1, wherein said trained image-processing method comprises steps:
    collecting a plurality of positive and negative samples and processing said positive and negative samples to obtain a plurality of positive and negative window images respectively corresponding to said positive and negative samples;
    processing said positive and negative window images to obtain pixels respectively corresponding to said positive and negative window images;
    selecting said positive and negative samples to train a setting of parameters of a second MLP operation;
    processing said positive and negative samples used in said second MLP operation to obtain weighted values corresponding to said positive and negative samples used in said second MLP operation;
    selecting said positive and negative samples having specified ranges of weighted values according to said weighted values corresponding to said positive and negative samples to train a setting of parameters of a pre-filter; and
    selecting a portion of said positive and negative samples from said positive and negative samples used in said setting of parameters of said pre-filter to train a setting of parameters of a first MLP operation.

3. The object image detection method according to claim 2, wherein a normalization operation is performed on said positive and negative samples after said step of collecting said positive and negative samples.

4. The object image detection method according to claim 2, wherein corresponding surface features are extracted from said positive and negative window images after said step of calculating said positive and negative samples to obtain said positive and negative window images respectively corresponding to said positive and negative samples.

5. The object image detection method according to claim 4, wherein a 1-D Haar transform is used to realize extracting said corresponding surface features from said positive and negative window images.

6. The object image detection method according to claim 2, wherein said step of calculating said positive and negative window images to obtain pixels respectively corresponding to said positive and negative window images is realized with a convolution operation or a subsampling algorithm, and is used to achieve dimensional reduction or information fusion of said pixels of said positive and negative window images.

7. The object image detection method according to claim 2, wherein in said step of selecting from said positive and negative samples to train a setting of parameters of a second MLP operation, selecting portion of said positive and negative samples from all said positive and negative window images is realized with a principal component analysis (PCA) technology.

8. The object image detection method according to claim 2, wherein training said first or second MLP operation is realizes with a gradient-based learning algorithm; said second MLP operation is a fine-level MLP verification; said first MLP operation is a coarse-level MLP verification.

9. The object image detection method according to claim 2, wherein in said step of selecting some of said positive and negative samples to train said setting of parameters of said second MLP operation, said parameters include parameters of a second MLP verifier and parameters of a second MLP convolutional feature map.

10. The object image detection method according to claim 2, wherein in said step of calculating said positive and negative samples used in said second MLP operation to obtain said weighted values corresponding to said positive and negative samples used in said second MLP operation, said weighted values corresponding to said positive and negative samples are obtained with a boosting algorithm.

11. The object image detection method according to claim 2, wherein in said step of selecting said positive and negative samples having specified ranges of weighted values according to said weighted values corresponding to said positive and negative samples to train said setting of parameters of said pre-filter, a number of said positive and negative samples having specified ranges of weighted values is a half of a number of all said positive and negative samples.

12. The object image detection method according to claim 2, wherein in said step of selecting a portion of said positive and negative samples from said positive and negative samples used in training said pre-filter to train said setting of parameters of said first MLP operation, said parameters include parameters of a first MLP verifier and parameters of a first MLP convolutional feature map.

13. The object image detection method according to claim 2, wherein a number of said positive and negative samples used by said first MLP operation is a half of a number of said positive and negative samples used by said second MLP operation.

14. The object image detection method according to claim 1, wherein a normalization operation is performed on said sample after said step of collecting said sample.

15. The object image detection method according to claim 1, wherein corresponding surface features are extracted from said window images after said step of collecting said sample and working out said window images corresponding to said sample.

16. The object image detection method according to claim 15, wherein a 1-D Haar transform is used to realize extracting said corresponding surface features from said window images.

17. The object image detection method according to claim 1, wherein said step of calculating said window images to obtain pixels respectively corresponding to said window images is realized with a convolution operation or a subsampling algorithm, and is used to achieve dimensional reduction or information fusion of said pixels of said window images.

18. The object image detection method according to claim 1, wherein in said step of calculating said pixels to obtain weighted values corresponding to said pixels, said weighted values corresponding to said pixels are obtained with a boosting algorithm.

19. The object image detection method according to claim 2, wherein said sample is a human face image; said positive samples are human face images, and said negative samples are non-face images.

20. The object image detection method according to claim 1, wherein in said step of screening all said window images according to said weighted values of said pixels to perform said pre-filter process and obtain said screened window images from all said window images, each said screened window image contains at least 90% of feature information.

21. The object image detection method according to claim 1, wherein said step of performing at least two cycles of multi-layer perception (MLP) operations to verify said image formed of said screened window images includes:
  screening said screened window images once again to perform a first MLP operation; and
  performing a second MLP operation on all said screened window images to determine whether an object image formed of said screened window images is true or false.

22. The object image detection method according to claim 21, wherein in said step of screening said screened window images once again to perform a first MLP operation, said first MLP operation is a coarse-level MLP operation.

23. The object image detection method according to claim 21, wherein in said step of performing a second MLP operation on all said screened window images to determine whether said object image formed of said screened window images is true or false, said second MLP operation is a fine-level MLP operation.

24. The object image detection method according to claim 1, wherein in a case that said object is a human face, if said sample is determined to be true, said sample is a human face image; if said sample is determined to be false, said sample is a non-face image.

* * * * *